US012583062B2

(12) United States Patent
Kwon

(10) Patent No.: US 12,583,062 B2
(45) Date of Patent: Mar. 24, 2026

(54) WELDING APPARATUS, WELDING METHOD, AND ELECTRODE ASSEMBLY

(71) Applicant: LG Energy Solution, Ltd., Seoul (KR)

(72) Inventor: Gi Hwan Kwon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/698,293

(22) PCT Filed: Nov. 15, 2022

(86) PCT No.: PCT/KR2022/018003
§ 371 (c)(1),
(2) Date: Apr. 3, 2024

(87) PCT Pub. No.: WO2023/101265
PCT Pub. Date: Jun. 8, 2023

(65) Prior Publication Data
US 2024/0391035 A1 Nov. 28, 2024

(30) Foreign Application Priority Data
Nov. 30, 2021 (KR) ........................ 10-2021-0169085

(51) Int. Cl.
*B23K 20/00* (2006.01)
*B23K 20/10* (2006.01)
(Continued)

(52) U.S. Cl.
CPC .......... *B23K 37/0435* (2013.01); *B23K 20/10* (2013.01); *B23K 2101/36* (2018.08)

(58) Field of Classification Search
CPC ........ B23K 20/10–106; B23K 2101/36; B23K 20/00–04; B23K 37/04–047;
(Continued)

(56) References Cited

U.S. PATENT DOCUMENTS 11,075,374 B2 7/2021 Mino
12,358,069 B2 * 7/2025 Son ..................... H01M 50/536
(Continued)

FOREIGN PATENT DOCUMENTS

CN 205376628 U * 7/2016
JP 4442183 B2 3/2010
(Continued)

OTHER PUBLICATIONS

Extended European Search Report including Written Opinion for Application No. 22901623.3, dated 12102024. 8 pgs.
(Continued)

*Primary Examiner* — Kiley S Stoner
(74) *Attorney, Agent, or Firm* — Lerner David LLP

(57) ABSTRACT
A welding apparatus configured to weld a plurality of electrode tabs of an electrode assembly, the welding apparatus including a pair of guides configured to gather the plurality of electrode tabs and a welding part configured to weld the plurality of electrode tabs gathered by the pair of guides. Each of the guides including an elevation part elevated with respect to the electrode tabs and a rotation part configured to rotate with respect to the elevation part when each of the electrode tabs is pressed so as to pull the electrode tabs toward the electrode assembly.

12 Claims, 10 Drawing Sheets

(51) Int. Cl.
    *B23K 37/00*       (2025.01)
    *B23K 37/04*       (2006.01)
    *B23K 101/36*     (2006.01)

(58) Field of Classification Search
    CPC .......... B23K 26/20–324; H01M 10/04; H01M
              10/0404; H01M 10/0413; H01M 50/536;
                      H01M 50/54; Y02E 60/10
    USPC ......... 228/44.7, 44.3, 49.5, 49.4, 49.1, 47.1,
                     228/1.1, 110.1, 179.1–180.22
    See application file for complete search history.

(56) References Cited

U.S. PATENT DOCUMENTS

| | | |
|---|---|---|
| 2009/0317717 A1 | 12/2009 | Ryu et al. |
| 2010/0248030 A1 | 9/2010 | Ryu et al. |
| 2015/0380717 A1 | 12/2015 | Ryu et al. |
| 2017/0346049 A1 | 11/2017 | Sasaki |
| 2019/0064277 A1* | 2/2019 | Cai ..................... H01M 10/482 |
| 2019/0148705 A1 | 5/2019 | Park et al. |
| 2019/0379016 A1 | 12/2019 | Kim et al. |
| 2021/0098766 A1 | 4/2021 | Ban et al. |
| 2021/0280841 A1 | 9/2021 | Aizawa et al. |
| 2023/0339038 A1* | 10/2023 | Son ....................... H01M 50/54 |
| 2024/0039028 A1* | 2/2024 | Miyata ................... H01M 50/55 |
| 2024/0391035 A1* | 11/2024 | Kwon ................ B23K 37/0435 |

FOREIGN PATENT DOCUMENTS

| | | | | |
|---|---|---|---|---|
| JP | 2021140898 A | | 9/2021 | |
| KR | 20120069905 A | * | 6/2012 | ........ H01M 10/0468 |
| KR | 20130122998 A | * | 11/2013 | .......... H01M 50/531 |
| KR | 20170019445 A | * | 2/2017 | .......... B29C 65/087 |
| KR | 20170095072 A | | 8/2017 | |
| KR | 102145493 B1 | | 8/2020 | |
| KR | 20200105272 A | | 9/2020 | |
| KR | 20210021871 A | | 3/2021 | |
| KR | 2021-0037902 A | | 4/2021 | |
| KR | 102234993 B1 | | 4/2021 | |
| KR | 2023081223 A | * | 6/2023 | |
| SK | 47996 A3 | * | 2/1997 | ........ H01R 43/0207 |
| WO | 2008-013381 A1 | | 1/2008 | |
| WO | 2013160932 A1 | | 10/2013 | |
| WO | WO-2020066240 A1 | * | 4/2020 | .......... H01M 50/531 |
| WO | WO-2022149916 A1 | * | 7/2022 | ........... B23K 20/106 |
| WO | WO-2023096470 A1 | * | 6/2023 | ............ B23K 20/10 |
| WO | WO-2023121392 A1 | * | 6/2023 | .......... H01M 50/178 |

OTHER PUBLICATIONS

International Search Report for Application No. PCT /KR2022/ 018003 mailed Feb. 22, 2023. 4 pgs.

\* cited by examiner

[FIG. 2]
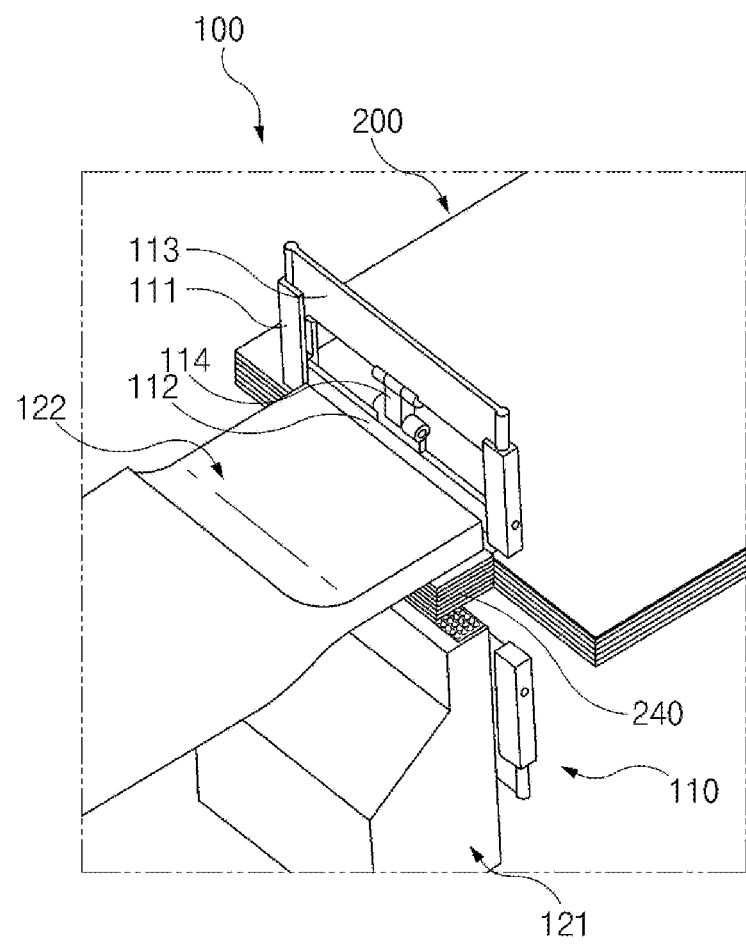

[FIG. 3]
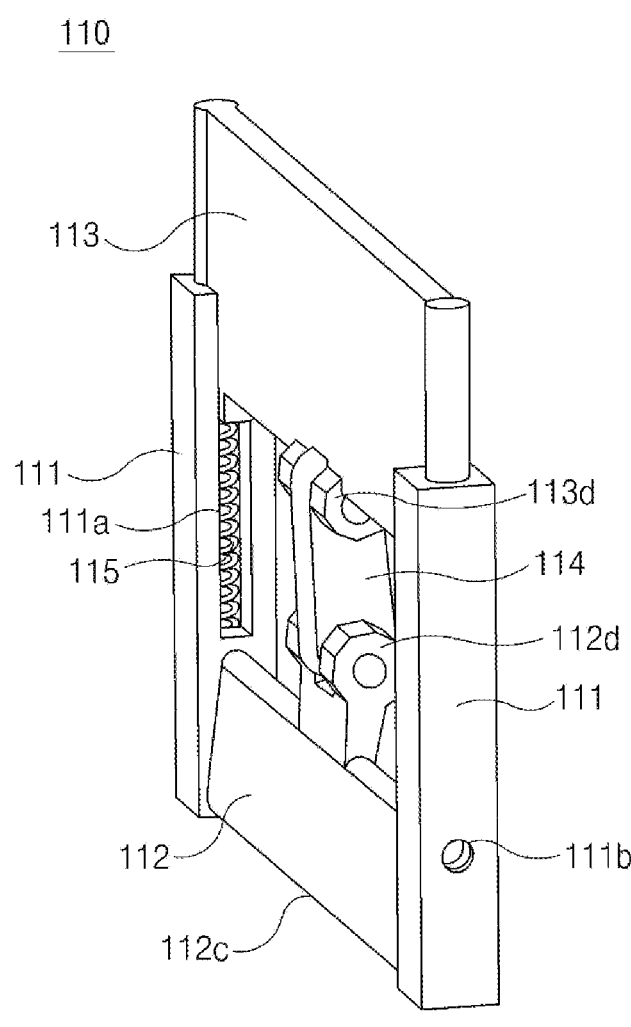

[FIG. 4a]
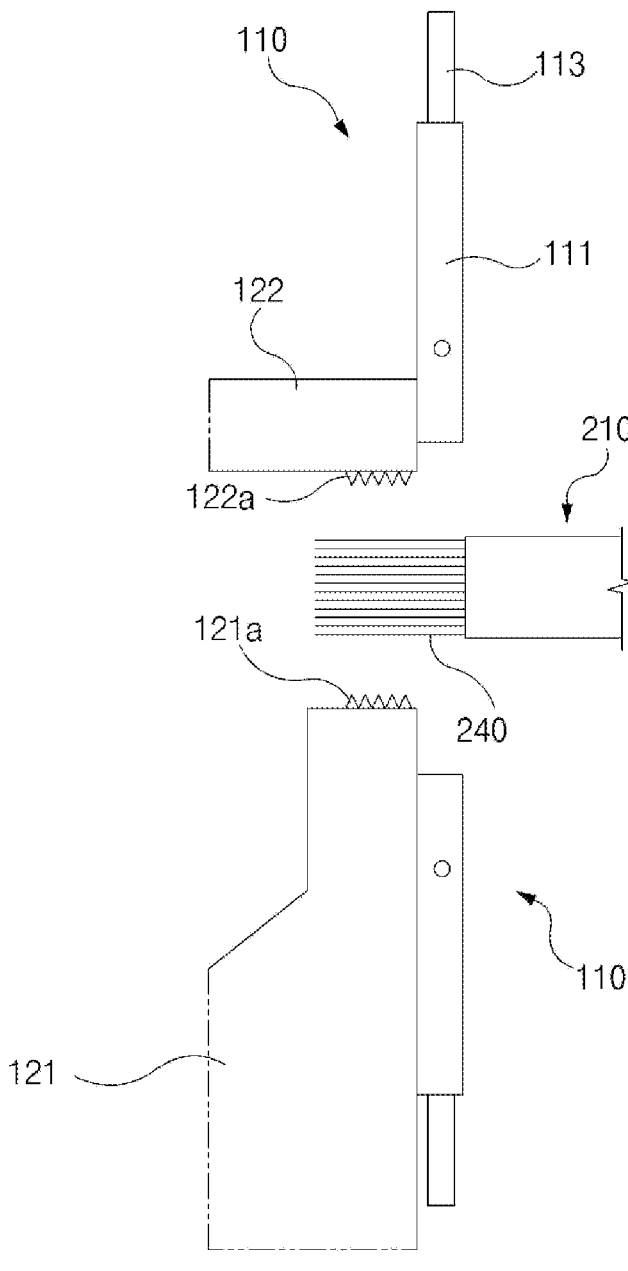

[FIG. 4b]
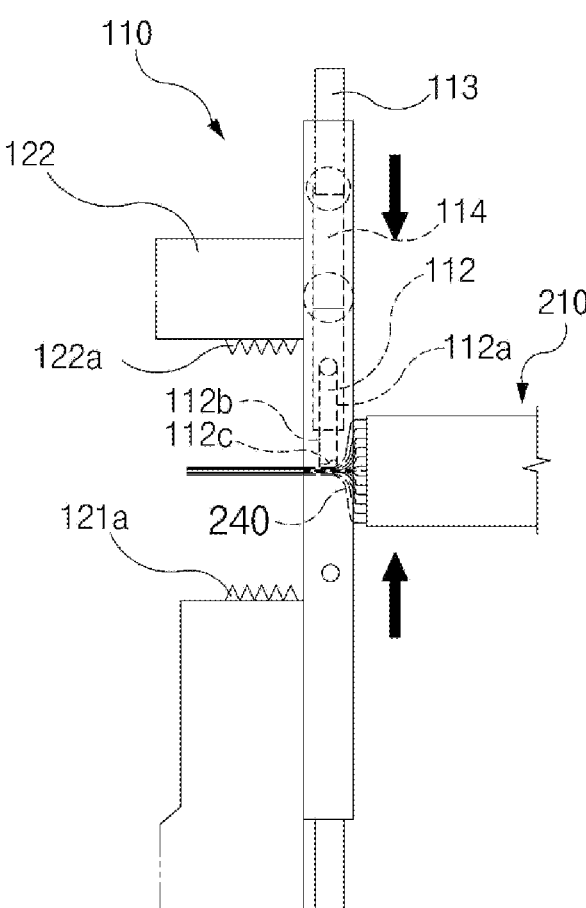

[FIG. 4c]
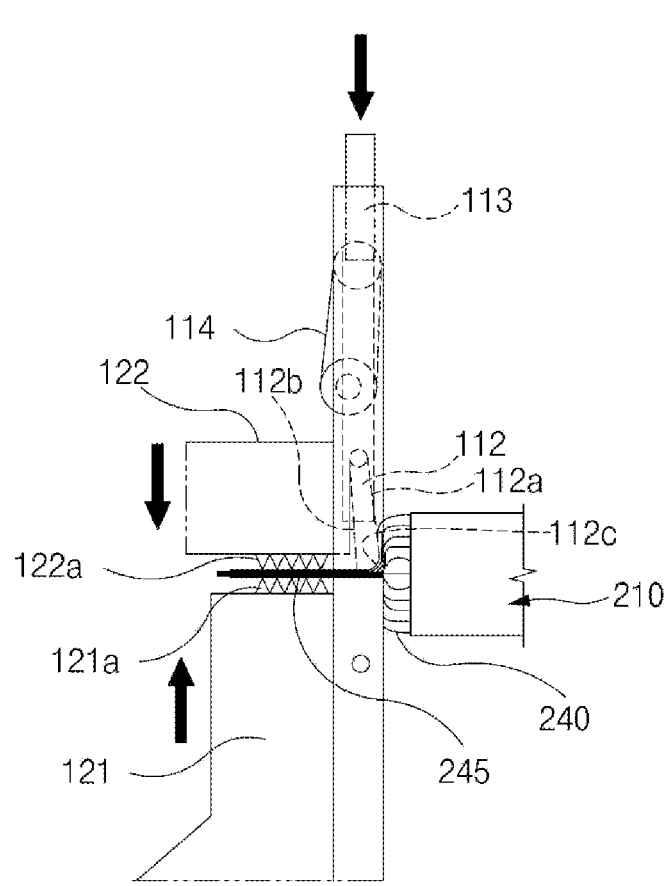

[FIG. 5]
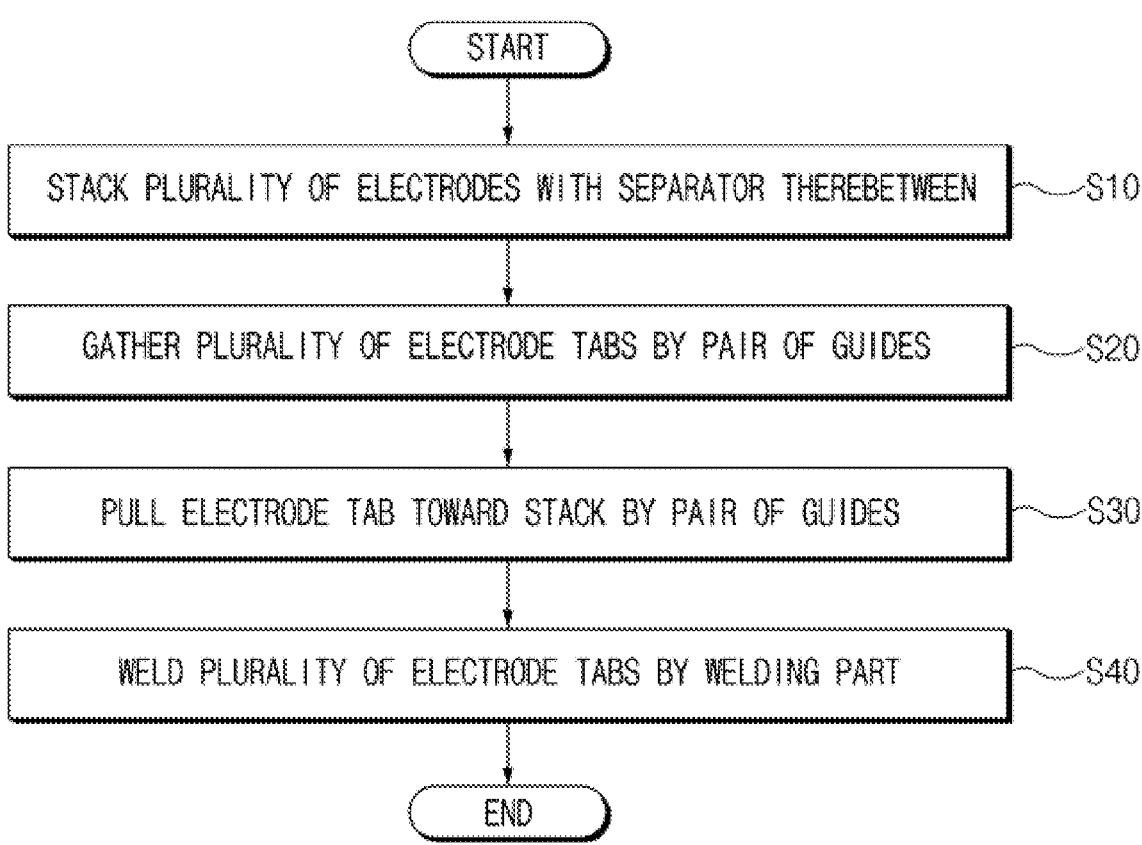
START
STACK PLURALITY OF ELECTRODES WITH SEPARATOR THEREBETWEEN — S10
GATHER PLURALITY OF ELECTRODE TABS BY PAIR OF GUIDES — S20
PULL ELECTRODE TAB TOWARD STACK BY PAIR OF GUIDES — S30
WELD PLURALITY OF ELECTRODE TABS BY WELDING PART — S40
END

[FIG. 7]
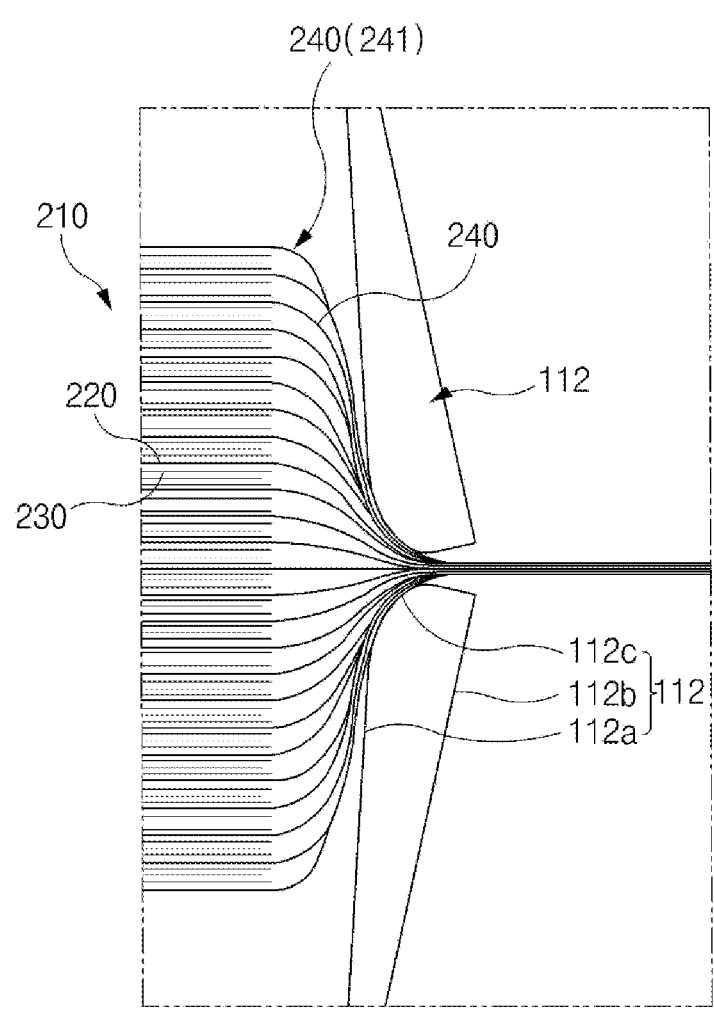

[FIG. 8]
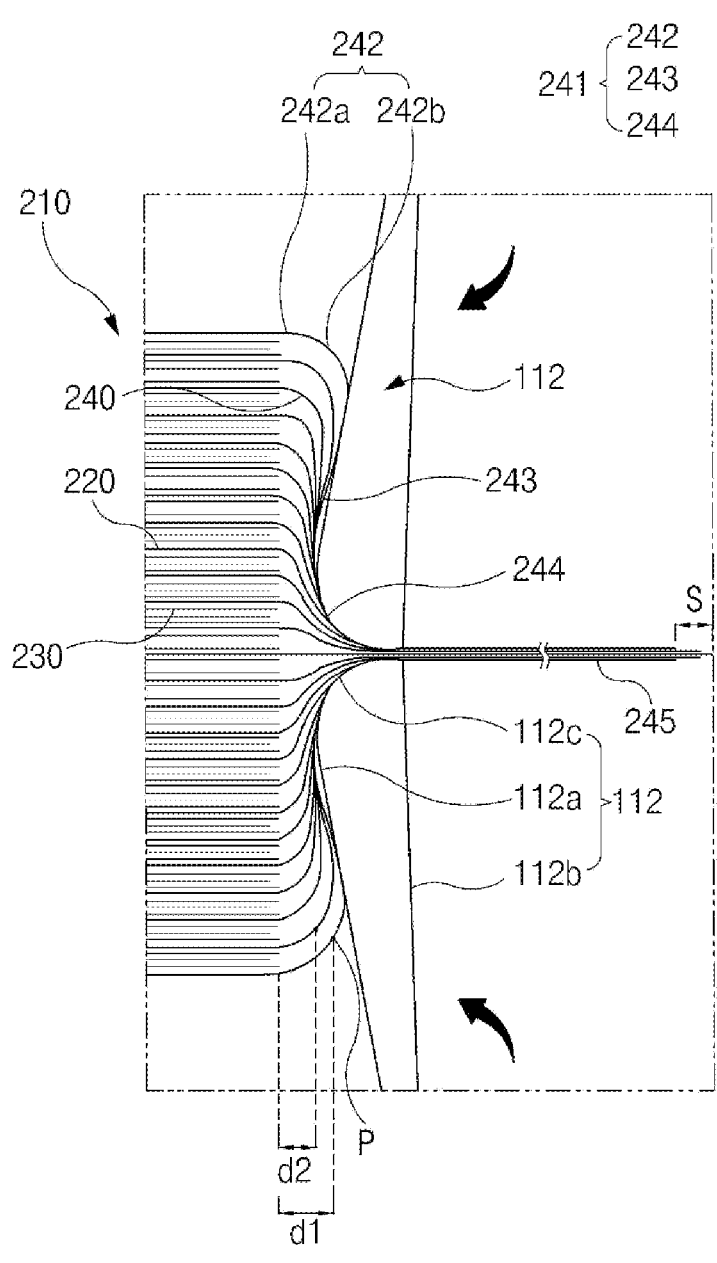

WELDING APPARATUS, WELDING METHOD, AND ELECTRODE ASSEMBLY

CROSS-REFERENCE TO RELATED APPLICATION

The present application is a national phase entry under 35 U.S.C. § 371 of International Application No. PCT/KR2022/018003 filed on Nov. 15, 2022, which claims the benefit of the priority of Korean Patent Application No. 10-2021-0169085, filed on Nov. 30, 2021, all of which is hereby incorporated by reference in its entirety.

TECHNICAL FIELD

The present disclosure relates to a welding apparatus that welds a plurality of electrode tabs to each other, a welding method using the welding apparatus, and an electrode assembly including a plurality of electrode tabs welded by the welding apparatus.

BACKGROUND ART

Secondary batteries are rechargeable unlike primarily batteries, and also, the possibility of compact size and high capacity is high. Thus, recently, many studies on secondary batteries are being carried out. As technology development and demands for mobile devices increase, the demands for secondary batteries as energy sources are rapidly increasing.

Rechargeable batteries are classified into coin type batteries, cylindrical type batteries, prismatic type batteries, and pouch type batteries according to a shape of a battery case. In such a secondary battery, an electrode assembly mounted in a battery case is a chargeable and dischargeable power generating device having a structure in which an electrode and a separator are stacked.

The electrode assembly may be approximately classified into a jelly-roll type electrode assembly in which a separator is interposed between a positive electrode and a negative electrode, each of which is provided as the form of a sheet coated with an active material, and then, the positive electrode, the separator, and the negative electrode are wound, a stacked type electrode assembly in which a plurality of positive and negative electrodes with a separator therebetween are sequentially stacked, and a stack & folding type electrode assembly in which stacked type unit cells are wound together with a separation film having a long length.

FIG. 1 is a view illustrating an example of a state in which an electrode tab of a general pouch-type secondary battery is bent.

Referring to FIG. 1, a general pouch-type secondary battery may include a pouch 10 forming an outer appearance thereof and an electrode assembly 20 which is accommodated in a pouch 10 and in which a plurality of electrodes are stacked with a separator therebetween.

The pouch 10 may be formed by drawing and molding a pouch film, and the pouch film may be formed by laminating a metal layer, a first resin layer disposed at one side of the metal layer, and a second metal layer disposed at the other side of the metal layer. Thus, the pouch 10 may have appropriate strength and formability, and a portion accommodating a plurality of electrode tabs 30 to be described later may be easily deformed by external force.

The electrode assembly 20 may include a plurality of electrode tabs 30 connected to the plurality of electrodes. Some of an outer portion of the plurality of electrode tabs 30 may be welded to each other to form a portion 31 to be welded, and the an electrode lead 40 protruding to the outside of the pouch 10 may be welded to the portion 31 to be welded. Due to this configuration, the plurality of electrodes of the electrode assembly 20 may be electrically connected to an external terminal (not shown) through the plurality of electrode tabs 30 and the electrode lead 40.

According to the related art, as illustrated in FIG. 1, when the electrode lead 40 is bent to one side (e.g., upper side) by an external impact or external force, there is a problem in that tension is excessively applied to the outermost electrode tab (e.g., the lower outermost electrode tab) disposed at a side opposite to the one side among the plurality of electrode tabs 30, and thus, the outermost electrode tab is broken and disconnected.

In addition, in a process of welding the plurality of electrode tabs 30, the welding is performed in a state in which the electrode tab 30 disposed outside is greatly deformed. Therefore, in the related art, in the process of welding the plurality of electrode tabs 30, there is a problem in that the excessive tension is applied to the outermost electrode tab, and thus, the outermost electrode tab is broken and disconnected.

DISCLOSURE

Technical Problem

One object of the embodiments of the present invention for solving this problem is to provide a welding apparatus and method, which prevent excessive tension from being applied to an electrode tab.

Another object of the embodiments of the present invention for solving this problem is to provide an electrode assembly in which excessive tension is not applied to an electrode tab.

Technical Solution

A welding apparatus according to an embodiment of the present invention may weld a plurality of electrode tabs of an electrode assembly. The welding apparatus may include: a pair of guides configured to gather the plurality of electrode tabs; and a welding part configured to weld the plurality of electrode tabs gathered by the pair of guides. Each of the guides may include: an elevation part elevated with respect to the electrode tabs; and a rotation part configured to rotate with respect to the elevation part when each of the electrode tabs is pressed so as to pull the electrode tabs toward the electrode assembly.

The rotation part may include: a first surface facing the electrode assembly; a second surface disposed at an opposite side of the first surface; and an edge configured to connect the first surface to the second surface and formed to be rounded so as to press the electrode tabs.

A length of the second surface may be greater than that of the first surface.

A distance between the first surface and the second surface may increase as approaching the edge.

The elevation part may be provided in a pair, which extend in a vertical direction and are spaced apart from each other in a width direction of the electrode tab.

Each of the guides may further include: a slider slid with respect to the elevation part; and a link configured to connect the slider to the rotation part and configured to interlock operations of the slider and the rotation part with each other.

A connection part hinge-connected to the link may be provided on each of the slider and the rotation part.

When the slider moves toward the rotation part, the rotation part may be configured to pull the electrode tabs toward the electrode assembly.

Each of the guides may further include an elastic member configured to apply elastic force in a direction away from the rotation part.

A sliding groove into which an end of the slider is inserted and in which the elastic member is disposed may be formed in the elevation part.

A welding method according to an embodiment of the present invention may weld a plurality of electrode tabs provided in an electrode assembly to each other. The welding method may include: gathering the plurality of electrode tabs by allowing a pair of guides to approach each other; pulling the electrode tabs toward the electrode assembly by the pair of guides; and welding the plurality of electrode tabs to each other by a welding part.

Each of the guides may include: an elevation part elevated with respect to the electrode tabs; and a rotation part that is in contact with the electrode tabs and rotates with respect to the elevation part. In the gathering of the plurality of electrode tabs, the elevation part may move toward the electrode tabs so that the rotation part presses the electrode tabs, and in the pulling of the electrode tabs, the rotation part may rotate in the state of pressing the electrode tabs.

Each of the guides may further include: a slider slid with respect to the elevation part; and a link configured to connect the slider to the rotation part and configured to interlock operations of the slider and the rotation part with each other. In the pulling of the electrode tabs, the slider may move toward the rotation part so that the rotation part rotates.

An electrode assembly according to an embodiment of the present invention may include: a stack in which a plurality of electrodes are stacked with a separator therebetween; and a plurality of electrode tabs connected to the plurality of electrodes and welded to each other to form a portion to be welded. The outermost electrode tab of the plurality of electrode tabs may include: a first section extending from the electrode and from which a distance to the stack increases; and a second section extending from the first section and from which a distance to the stack decreases.

The outermost electrode tab may further include a third section extending from the second section to the portion to be welded and from which a distance to the stack increases.

At least a portion of the plurality of electrode tabs may include a flat part connected to the electrode and formed to be flat, and a length of the flat part increases as the electrode tab is disposed more outward.

The first section may include: a flat part connected to the electrode and formed to be flat; and a bent part configured to connect the flat part to the second section and formed to be bent.

An outer end of the outermost electrode tab may be stepped inward with respect to an outer end of the other electrode tab.

A length from a point, at which a curvature is maximized in the outermost electrode tab, to the electrode may be greater than that from a point, at which a curvature is maximized in the other electrode tab, to the electrode.

Advantageous Effects

According to the preferred embodiment of the present invention, since the welding part welds the plurality of electrode tabs in the state in which the rotation part of the guide pulls the electrode tabs, the length between the stack and the portion to be welded may increase with respect to the electrode tabs, particularly, the outermost electrode tab. As a result, the breakage of the outermost electrode tab due to the tension or vibration generated in the electrode tab by the welding part may be prevented from occurring.

In addition, in the manufactured electrode assembly, the electrode tab, particularly, the outermost electrode tab may be prevented from being broken and disconnected by the deformation such as the bending of the lead. As a result, the safety and reliability of the electrode assembly may be improved.

In addition, the effects that are obvious to those skilled in the art may be predicted from the configurations according to the embodiments of the present invention.

BRIEF DESCRIPTION OF THE DRAWINGS

The following drawings attached in this specification illustrate a preferred embodiment of the present invention and function to make further understood the technical spirit of the present invention along with the detailed description of the embodiments of the invention, and thus, the present invention should not be construed as being limited to only the drawings.

FIG. 2 is a perspective view of a welding apparatus according to an embodiment of the present invention.

FIG. 3 is a perspective view of a guide according to an embodiment of the present invention.

FIGS. 4a to 4c are views for explaining an operation of the guide according to an embodiment of the present invention.

FIG. 5 is a flowchart illustrating a welding method according to another embodiment of the present invention.

FIGS. 7 and 8 are enlarged side views illustrating an electrode tab of the electrode assembly and a surrounding of the electrode tab according to further another embodiment of the present invention.

DETAILED DESCRIPTION

Figure 1:
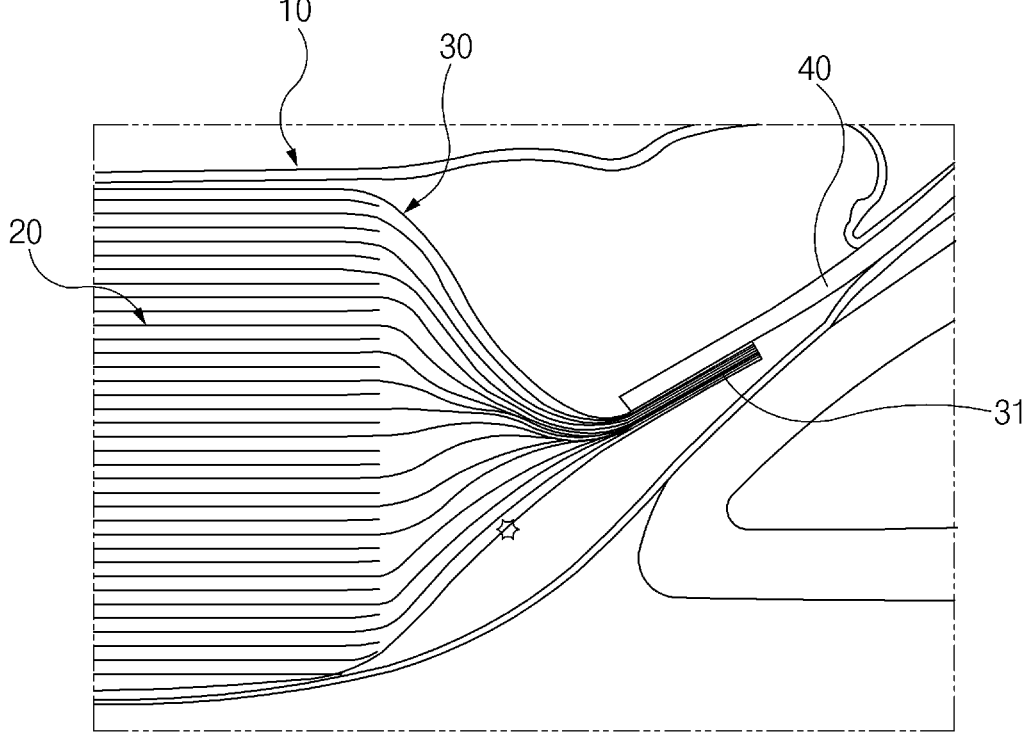
FIG. 1 is a view illustrating an example of a state in which an electrode tab of a general pouch-type secondary battery is bent.

Hereinafter, preferred embodiments of the present invention will be described in detail with reference to the accompanying drawings so that those of ordinary skill in the art can easily carry out the embodiments of the present invention. However, the present invention may be implemented in several different forms and is not limited or restricted by the following examples.

In order to clearly explain the embodiments of the present invention, detailed descriptions of portions that are irrelevant to the description or related known technologies that may unnecessarily obscure the gist of the embodiments of the present invention have been omitted, and in the present specification, reference symbols are added to components in each drawing. In this case, the same or similar reference numerals are assigned to the same or similar elements throughout the specification.

Also, terms or words used in this specification and claims should not be restrictively interpreted as ordinary meanings or dictionary-based meanings, but should be interpreted as meanings and concepts conforming to the scope of the present disclosure on the basis of the principle that an inventor can properly define the concept of a term to describe and explain embodiments of his or her invention in the best ways.

FIG. 2 is a perspective view of a welding apparatus according to an embodiment of the present invention, FIG. 3 is a perspective view of a guide according to an embodiment of the present invention, and FIGS. 4a to 4c are views for explaining an operation of the guide according to an embodiment of the present invention.

A welding apparatus 100 according to this embodiment may weld a plurality of electrode tabs 240 of an electrode assembly 200. The electrode assembly 200 may include a stack 210 in which a plurality of electrodes are stacked with a separator therebetween, and a plurality of electrode tabs 240 connected to the plurality of electrodes.

In more detail, the welding apparatus 100 may include a pair of guides 110 that gather the plurality of electrode tabs 240 and welding parts 121 and 122 that weld the plurality of electrode tabs 240 that are gathered by the pair of guides 110.

The pair of guides 110 may be disposed at sides opposite to each other with the plurality of electrode tabs 240 therebetween, and at least one of the pair of guides 110, preferably each guide 110 may be configured to be elevatable with respect to the electrode tabs 240. The pair of guides 110 may approach each other to grip the plurality of electrode tabs 240. The pair of guides 110 may gather the plurality of electrode tabs 240. The detailed configuration and operation of each guide 110 will be described later in detail.

The welding parts 121 and 122 may weld the plurality of electrode tabs 240 gathered by the pair of guides 110 to form a portion 245 (see FIG. 4c) to be welded (hereinafter, referred to as a welded portion). That is, the welded portion 245 may be a portion at which the plurality of electrode tabs 240 are welded to each other.

The pair of guides 110 may grip a portion of the electrode tab 240, which is relatively adjacent to the stack 210 of the electrode assembly 200, among the electrode tabs 240, and the welding parts 121 and 122 may weld a portion of the electrode tab 240, which is relatively far from the stack 210, among the electrode tabs 240. The welded portion 245 may be spaced apart from the stack 210, and the plurality of electrode tabs 240 may extend closer to each other toward the welded portion 245.

The welding parts 121 and 122 may ultrasonically weld the plurality of electrode tabs 240 to each other. In more detail, the welding parts 121 and 122 may include an anvil 121 disposed at one side (e.g., lower side) of the plurality of electrode tabs 240 and a horn 122 disposed at the other side (e.g., upper side) of the plurality of electrode tabs 240. At least one of the anvil 121 and the horn 122 may be configured to be elevatable with respect to the electrode tabs 240.

One of the pair of guides 110 may be disposed adjacent to the anvil 121, and the other of the pair of guides 110 may be disposed adjacent to the horn 122.

In a state in which the plurality of electrode tabs 240 are pressed between the anvil 121 and the horn 122, the horn 122 may vibrate at a high frequency, and thus, the plurality of electrode tabs 240 may be welded to each other. A protrusion 121a that presses the plurality of electrode tabs 240 from one side may be formed on the anvil 121, and a protrusion 122a that presses the plurality of electrode tabs 240 from the other side may be formed on the horn 122. Thus, a plurality of uneven shapes corresponding to the protrusions 121a and 122a may be formed on the welded portion 245 (see FIG. 4c) formed on the plurality of electrode tabs 240.

Each of the guides 110 may include an elevation part 111 that is elevated with respect to the electrode tab 240 and a rotation part 112 that rotates with respect to the elevation part 111 while pressing the electrode tab 240. The guide 110 may further include a slider 113 that is slid with respect to the elevation part 111 and a link 114 that interlocks operations of the slider 113 and the rotation part 112 with each other.

It is obvious to those skilled in the art that the welding apparatus 100 may include an elevation mechanism (not shown) for elevating the elevation part 111.

The elevation part 111 may extend in a vertical direction. The elevation part 111 may have a pillar shape extending in a substantially vertical direction. A pair of elevation parts 111 spaced apart in a width direction of the electrode tab 240 may be provided. The pair of elevation parts 111 may be disposed at both sides of the rotation part 112.

A sliding groove 111a for guiding the slider 113 may be formed in the elevation part 111. The sliding groove 111a may extend in a longitudinal direction of the elevation part 111, that is, in the vertical direction. The sliding groove 111a may be formed in an inner surface of the elevation part 111. The sliding grooves 111a of the pair of elevation parts 111 may face each other.

A connection hole 111b to which the rotation part 112 is rotatably connected may be formed in the elevation part 111. The connection hole 111b may be formed at a position closer to the electrode tab 240 than the sliding groove 111a. The connection holes 111b of the pair of elevation parts 111 may face each other.

The rotation part 112 rotates with respect to the elevation part 111 to pull the electrode tab 240 toward the electrode assembly 200, more specifically, the stack 210. Thus, a length between the stack 210 and the welded portion 245 may increase with respect to the electrode tab 240, particularly, the outermost electrode tab. Therefore, the length of the outermost electrode tab may have a margin and may not be disconnected by external force or the like. This will be described in more detail later.

The rotation part 112 may be a plate-shaped member that extends in the width direction of the electrode tab 240 and is erected in the substantially vertical direction. The rotation part 112 may be rotatably connected to the elevation part 111. In more detail, the rotation part 112 may be provided with a rotation shaft protruding from both sides, and the rotation shaft may be inserted into the connection hole 111b formed in the elevation part 111.

In more detail, the rotation part 112 may include a first surface 112a facing the electrode assembly 200, a second surface 112b disposed at an opposite side of the first surface 112a, and an edge 112c connecting the first surface 112a to the second surface 112b and formed to be rounded.

The edge 112c may press the electrode tab 240. Since the edge 112c is formed to be rounded, damage to the electrode tab 240 pressed by the edge 112c may be prevented. When the rotation part 112 rotates, the edge 112c may pull the electrode tab 240 toward the electrode assembly 200, more specifically, the stack 210 while maintaining the state of pressing the electrode tab 240. In order to allow the edge 112c to reliably pull the electrode tab 240, it is also possible that a member (e.g., rubber) having high frictional force is provided on the edge 112c.

The rotation shaft of the rotation part 112 may be provided on an end of a side opposite to the edge 112c. Therefore, even if the rotation part 112 rotates slightly, a path along which the edge 112*c* moves may be lengthened, and the edge 112*c* may sufficiently pull the electrode tab 240.

A length of the second surface 112*b* may be longer than that of the first surface 112*a*. The edge 112*c* connecting the first surface 112*a* to the second surface 112*b* may be formed to be eccentric with respect to the electrode assembly 200, more specifically, the stack 210. Thus, contact between the edge 112*c* and the electrode tab 240 may be reliably maintained while the rotation part 112 pulls the electrode tab 240 toward the stack 210 while rotating.

The first surface 112*a* and the second surface 112*b* may be formed obliquely to each other. In more detail, the distance between the first surface 112*a* and the second surface 112*b* may increase as be approaching the edge 112*c*. As a result, a length of the edge 112*c* in the round direction may increase, and a contact area with respect to the electrode tab 240 may be widened.

The slider 113 may be slid with respect to the elevation part 111. The slider 113 may be a plate-shaped member that extends in the width direction of the electrode tab 240 and is erected in the substantially vertical direction. The slider 113 may be disposed on the opposite side of the electrode tab 240 with the rotation part 112 therebetween. The slider 113 may be slid in the longitudinal direction of the elevation part 111, that is, in the vertical direction.

The slider 113 may be slid along the sliding groove 111*a* formed in the elevation part 111. Both ends of the slider 113 may be inserted into the sliding grooves 111*a* formed in the pair of elevation parts 111.

The welding apparatus 100 may include a pressing mechanism (not shown) that presses the slider 113 toward the rotation part 112. The slider 113 may move in a direction closer to the rotation part 112 by the pressing mechanism. In addition, the slider 113 may move in a direction away from the rotation part 112 by an elastic member 115 to be described later.

The link 114 may have an approximately bar shape. The link 114 may connect the slider 113 to the rotation part 112. The link 114 may be rotatably connected to each of the slider 113 and the rotation part 112.

In more detail, the slider 113 and the rotation part 112 may be provided with connection parts 112*d* and 113*d* hinge-coupled to the link 114. The connection part 112*d* provided on the rotation part 112 may be provided on the end of the side opposite to the edge 112*c*. The connection part 113*d* provided on the slider 113 may be provided on an end of a side of the rotation part 112. The connection part 112*d* provided on the rotation part 112 may be hinge-connected to one end of the link 114, and the connection part 113*d* provided on the slider 113 may be hinge-coupled to the other end of the link 114.

The link 114 may interlock operations of the slider 113 and the rotation part 112 with each other. The link 114 may convert a linear motion of the slider 113 into a rotational motion of the rotation part 112. When the slider 113 moves toward the rotation part 112, the rotation part 112 may be configured to pull the electrode tab 240 toward the electrode assembly 200. That is, when the slider 113 moves toward the rotation part 112, the rotation part 112 may rotate toward the electrode assembly 200, more specifically, the stack 210. Conversely, when the slider 113 moves in the direction away from the rotation part 112, the rotation part 112 may rotate to the opposite side of the electrode assembly 200, more specifically, the stack 210.

The guide 110 may further include an elastic member 115 that applies elastic force to the slider 113 in the direction away from the rotation part 112. For example, the elastic member 115 may be a spring. The elastic member 115 may be disposed in the sliding groove 111*a* of the elevation part 111. When the slider 113 is pressed to move toward the rotation part 112, the elastic member 115 may be compressed, and when the external force applied to the slider 113 is removed, the slider 113 may move away from the rotation part 112 by the elastic force of the elastic member 115.

Hereinafter, the operation of the welding apparatus 100 according to this embodiment will be described.

As illustrated in FIG. 4*a*, the plurality of electrode tabs 240 of the electrode assembly 200 may be inserted between the pair of guides 110 and between the anvil 121 and the horn 122.

Thereafter, as illustrated in FIG. 4*b*, the pair of guides 110 may approach each other to gather the plurality of electrode tabs 240. The plurality of electrode tabs 240 may be gripped between the rotation parts 112 of the pair of guides 110. In more detail, the edge 112*c* of each of the rotation parts 112 may press the electrode tab 240, particularly the outermost electrode tab.

Thereafter, as illustrated in FIG. 4*c*, the pair of guides 110 may pull the electrode tab 240 toward the stack 210. In more detail, when the slider 113 moves toward the rotation part 112, the rotation part 112 may rotate with respect to the elevation part 111, and the edge 112*c* of the rotation part 112 may pull the outermost electrode tab toward the stack 210 while maintaining the state of being in contact with the outermost electrode tab. Here, since the plurality of electrode tabs 240 are in contact with each other, the frictional force may act with each other, and not only the outermost electrode tabs but also other electrode tabs may be pulled toward the stack 210.

In this state, the welding parts 121 and 122 may form the welded portion 245 by welding the electrode tabs 240. In more detail, at least one of the anvil 121 and the horn 122 may be elevated to compress and weld the plurality of electrode tabs 240.

Since the welding parts 121 and 122 weld the plurality of electrode tabs 240 while the rotation part 112 of the guide 110 pulls the electrode tab 240, a length between the stack 210 and the welded portion 245 may increase with respect to the electrode tab 240, particularly the outermost electrode tab.

Thus, the breakage of the electrode tab 240, particularly the outermost electrode tab by tension or vibration generated in the electrode tab 240 by the welding parts 121 and 122 may be prevented.

In addition, the electrode tab 240, particularly the outermost electrode tab may be prevented from being broken and disconnected by the external 1 force in the manufactured electrode assembly 200. As a result, the safety and reliability of the electrode assembly 200 may be improved.

FIG. 5 is a flowchart illustrating a welding method according to another embodiment of the present invention.

Hereinafter, a welding method using the welding apparatus 100 described above will be described as another embodiment of the present invention.

The welding method according to this embodiment may weld a plurality of electrode tabs 240 provided in an electrode assembly 200. In more detail, the welding method may include a process (S20) in which a pair of guides 110 approach each other to gather a plurality of electrode tabs 240, a process (S30) in which the pair of guides 110 pull the electrode tabs 240 toward the electrode assembly 200, and a process (S40) in which welding parts 121 and 122 weld the plurality of electrode tabs 240 to each other. In the welding method, before the process (S20) of gathering the plurality of electrode tabs 240, a process (S10) in which a plurality of electrodes 220 may be stacked with a separator 230 (see FIG. 7) therebetween to form a stack 210 may be further included.

In the process (S10) of forming the stack 210, the plurality of electrodes 220 (see FIG. 7) may be stacked with the separator 230 therebetween. The method for stacking the plurality of electrodes 220 is not limited. Each of the electrodes 220 may include a coating portion coated with an electrode active material on an electrode collector and a non-coating portion that is not coated with the electrode active material, and the non-coating portion may be processed into an appropriate shape to serve as the electrode tab 240.

In the process (S20) of gathering the plurality of electrode tabs 240, an elevation part 111 may move toward the electrode tab 240 so that a rotation part 112 presses the electrode tab 240. In more detail, the elevation parts 111 of the pair of guides 110 may approach each other, and the plurality of electrode tabs 240 may be gripped and gathered between the rotation parts 112 of the pair of guides 110.

In the process (S30) of pulling the electrode tab 240, the rotation part 112 may rotate while pressing the electrode tab 240. Here, a slider 113 may move toward the rotation part 112 so that the rotation part 112 rotates.

In the process (S40) of welding the plurality of electrode tabs 240 to each other, the welding parts 121 and 122 may weld the plurality of electrode tabs 240 to form a welded portion 245. In more detail, at least one of an anvil 121 and a horn 122 may be elevated to compress and weld the plurality of electrode tabs 240.

Although not shown in the drawings, an electrode lead may be additionally welded to the welded portion 245 formed on the plurality of electrode tabs 240. The welding of the electrode lead to the welded portion 245 may be performed by laser welding.

Figure 6:
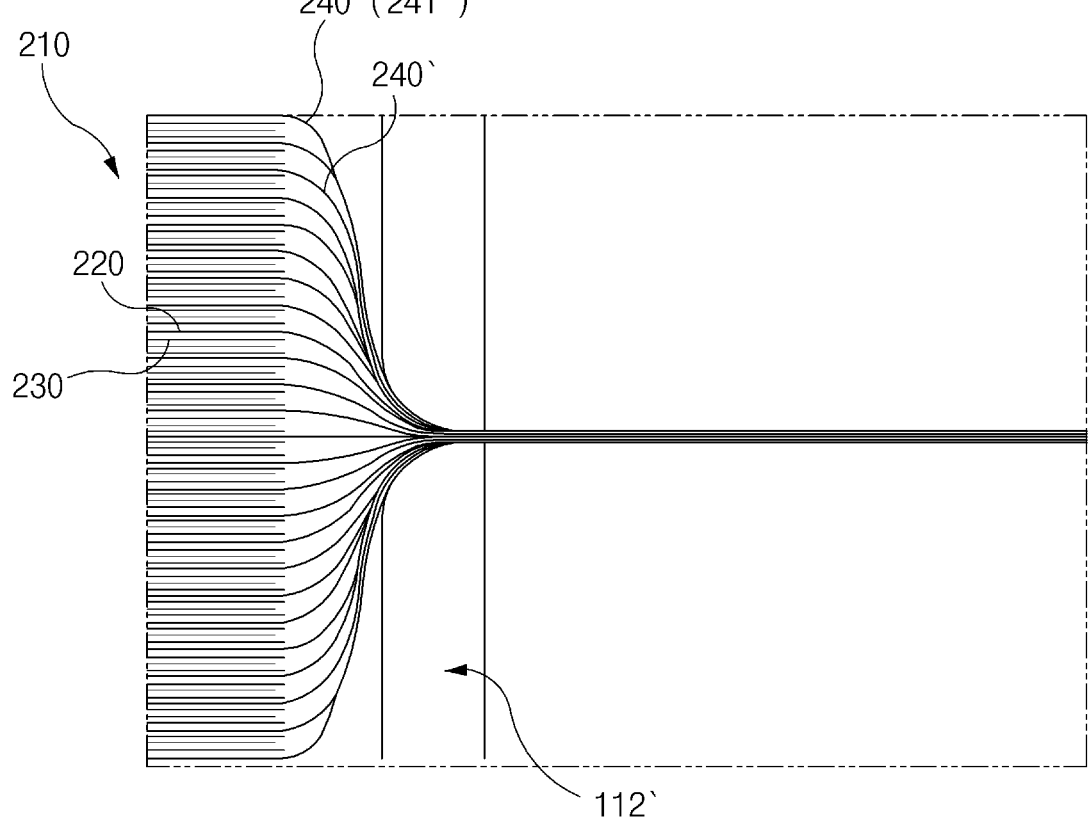
FIG. 6 is an enlarged side view illustrating an electrode tab of the electrode assembly and a surrounding of the electrode tab according to a comparative example.

FIG. 6 is an enlarged side view illustrating an electrode tab of the electrode assembly and a surrounding of the electrode tab according to a comparative example, and FIGS. 7 and 8 are enlarged side views illustrating an electrode tab of the electrode assembly and a surrounding of the electrode tab according to further another embodiment of the present invention.

In more detail, FIG. 7 illustrates a state in which a plurality of electrode tabs 240 are gathered by a rotation part 112 of a pair of guides 110, and FIG. 8 illustrates a state in which the rotation part 112 of the pair of guides 110 illustrated in FIG. 7 rotates to pull a plurality of electrode tabs 240 toward a stack 210.

Hereinafter, an electrode assembly 200 including a plurality of electrode tabs 240 welded by the welding apparatus 100 described above will be described as another embodiment of the present invention.

The electrode assembly 200 according to this embodiment may include a stack 210, in which a plurality of electrodes 220 are stacked with a separator 230 therebetween, and a plurality of electrode tabs 240 connected to the plurality of electrodes 220 and welded to each other to form a welded portion 245 (see FIG. 4c).

As described above, the plurality of electrode tabs 240 may be welded in a state in which a rotation part 112 of a guide 110 pulls the electrode tabs 240 toward the stack 210. Therefore, as illustrated in FIG. 8, the outermost electrode tab 241 among the plurality of electrode tabs 240 may form an approximate S-shape or a reverse S-shape. Although FIG. 8 illustrates a state in which the rotation part 112 of the pair of guides 110 grips the plurality of electrode tabs 240, after a welded portion 245 is formed, even if the pair of guides 110 are separated from the plurality of electrode tabs 240, and thus, the outermost electrode tab 241 is slightly deformed, the outermost electrode tab 241 may be maintained in the approximately S-shape or reverse S-shape.

In more detail, the outermost electrode tab 241 of the plurality of electrode tabs 240 may include a first section 242 which extends from an electrode 220 and from which a distance to the stack 210 increases, and a second section 243 which extends from the first section 242 and from which a distance to the stack 210 decreases. The outermost electrode tab 241 may further include a third section 244 which extends from the second section 243 to a portion 245 to be welded and from which a distance to the stack 210 increases.

The first section 242 includes a flat part 242a connected to the electrode 220 and formed to be flat, and a bent part 242b connecting the flat part 242a to the second section 243 and formed to be bent. A point at which the outermost electrode tab 241 starts to bend may be spaced a predetermined distance from the stack 210 with the flat part 242a therebetween. Thus, there is an advantage in preventing excessive stress concentration to the outermost electrode tab 241 from occurring.

At least some of the plurality of electrode tabs 240 as well as the outermost electrode tab 241 may include the flat part connected to the electrode 220 and formed to be flat. In this case, a length of the flat part may be longer as the electrode tab 240 is disposed closer to the outside. That is, the length of the flat part 242a of the outermost electrode tab 241 may be longer than that of the flat part of the other electrode tab 240.

A point P of the outermost electrode tab 241, at which a curvature is maximized, may be disposed on the bent part 242b. A length from the point P having the maximum curvature to the electrode 220 in the outermost electrode tab 241 may be greater than that from the point P having the maximum curvature to the electrode 220 in the other electrode tab 240. A distance d1 between the point P having the maximum curvature in the outermost electrode tab 241 and the stack 210 may be greater than a distance d2 between the point P having the maximum curvature in the other electrode tab 240 and the stack 210.

On the other hand, referring to FIG. 6, a plurality of electrode tabs 240' of an electrode assembly according to the comparative example may be welded together by a pair of guides 112', which do not include a rotation part. Therefore, the electrode tab 240', particularly the outermost electrode tab 241' may extend, and thus, there is no section in which the distance to the stack 210 decreases. For this reason, a length margin of the outermost electrode tab 241' is not secured, and excessively high tension acts on the outermost electrode tab 241' due to external force or the like to cause breakage. In addition, since the outermost electrode tab 241' is bent immediately at the point at which the outermost electrode tab 241' is connected to the electrode 220, the excessive stress concentration may occur, and thus, the breakage may occur.

Referring to FIG. 8 again, an outer end of the outermost electrode tab 241 may be stepped inward with respect to an outer end of the other electrode tab 240. For example, the outer end of the outermost electrode tab 241 and an outer end of a central electrode tab may form a predetermined stepped portion S.

While the outermost electrode tabs 241 are pulled toward the stack 210 by the rotation part 112 of the pair of guides 110, the other electrode tabs 240 may also be pulled toward the stack 210 by frictional force between the plurality of electrode tabs 240. Therefore, as the electrode tab 240 is disposed more outward, the electrode tabs 240 is more pulled toward the stack. Thus, the outer end of the outermost electrode tab 241 may be stepped inward with respect to the outer end of the other electrode tab 240.

However, cutting and the like may be performed to match the outer ends of the plurality of electrode tabs 240. In this case, the stepped portion may not be formed between the outer end of the outermost electrode tab 241 and the outer end of the other electrode tab 240.

The above description merely illustrates the technical idea of the present disclosure, and those of ordinary skill in the art to which the present disclosure pertains may make various modifications and variations without departing from the intrinsic characteristics of the present disclosure.

Thus, the embodiment of the present invention is to be considered illustrative, and not restrictive, and the technical spirit of the present invention is not limited to the foregoing embodiment.

Therefore, the scope of the present disclosure is defined not by the detailed description of the invention but by the appended claims, and all differences within the scope will be construed as being included in the present disclosure.

DESCRIPTION OF THE SYMBOLS

100: Welding apparatus
110: Guide
111: Elevation part
112: Rotation part
112*a*: First surface (of rotation part)
112*b*: Second surface (of rotation part)
112*c*: Edge (of rotation part)
113: Slider
114: Link
115: Elastic member
121: Anvil
122: Horn
200: Electrode assembly
210: Stack
220: Electrode
230: Separator
240: Electrode tab
241: Outermost electrode tab
242: First section (of outermost electrode tab)
242*a*: Flat part
242*b*: Bent part
243: Second section (of outermost electrode tab)
244: Third section (of outermost electrode tab)

The invention claimed is:

1. A welding apparatus, configured to weld a plurality of electrode tabs of an electrode assembly to each other, the welding apparatus comprising:
    a pair of guides configured to gather the plurality of electrode tabs; and
    a welding part configured to weld the plurality of electrode tabs gathered by the pair of guides,
    wherein each of the guides comprises:
        an elevation part arranged to be elevated with respect to the electrode tabs; and
        a rotation part configured to rotate with respect to the elevation part when each of the electrode tabs are pressed so as to pull the electrode tabs toward the electrode assembly.

2. The welding apparatus of claim 1, wherein the rotation part comprises:
    a first surface facing the electrode assembly;
    a second surface disposed at an opposite side of the first surface; and
    an edge configured to connect the first surface to the second surface and having a rounded portion configured to press the electrode tabs.

3. The welding apparatus of claim 2, wherein a length of the second surface is greater than a length of the first surface.

4. The welding apparatus of claim 2, wherein a distance between the first surface and the second surface increases in a direction approaching the edge.

5. The welding apparatus of claim 1, wherein the elevation part comprises a pair of elevation parts, which extend in a vertical direction and are spaced apart from each other in a width direction of the electrode tab.

6. The welding apparatus of claim 1, wherein each of the guides further comprises:
    a slider slidably attached to the elevation part; and
    a link configured to connect the slider to the rotation part and configured to interlock movement of the slider and the rotation part with each other.

7. The welding apparatus of claim 6, wherein connection parts that are hinge-connected to the link are disposed on each of the slider and the rotation part.

8. The welding apparatus of claim 6, wherein, when the slider moves toward the rotation part, the rotation part is configured to pull the electrode tabs toward the electrode assembly.

9. The welding apparatus of claim 6, wherein each of the guides further comprises an elastic member configured to apply elastic force in a direction away from the rotation part.

10. The welding apparatus of claim 9, wherein the elevation part includes a sliding groove into which an end of the slider is configured to be inserted and in which the elastic member is disposed.

11. A welding method for welding a plurality of electrode tabs provided in an electrode assembly to each other, the welding method comprising:
    gathering the plurality of electrode tabs by allowing a pair of guides to approach each other;
    pulling the electrode tabs toward the electrode assembly by the pair of guides; and
    welding the plurality of electrode tabs to each other by a welding part,
    wherein each of the guides comprises:
    an elevation part elevated with respect to the electrode tabs; and
    a rotation part that is in contact with the electrode tabs and rotates with respect to the elevation part,
    wherein, in the gathering of the plurality of electrode tabs, the elevation part moves toward the electrode tabs so that the rotation part presses the electrode tabs, and
    in the pulling of the electrode tabs, the rotation part rotates while pressing the electrode tabs.

12. The welding method of claim 11, wherein each of the guides further comprises:
    a slider slidably attached to the elevation part; and
    a link configured to connect the slider to the rotation part and configured to interlock movement of the slider and the rotation part with each other,
    wherein, in the pulling of the electrode tabs, the slider moves toward the rotation part so that the rotation part rotates.

* * * * *